United States Patent
Jordan et al.

(10) Patent No.: US 9,135,668 B2
(45) Date of Patent: Sep. 15, 2015

(54) CONTACT CENTER ROUTING USING CHARACTERISTIC MAPPING

(75) Inventors: Kenneth Jordan, Groton, MA (US);
Michael Paul Lepore, Marlborough, MA (US); Paul Robert Schechinger, Londonderry, NH (US); Kevin Collins, Roseville, CA (US); Rick Whitesel, Nashua, NH (US); Lawrence E. Johnson, Sudbury, MA (US); Victor L. Voydock, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1509 days.

(21) Appl. No.: 12/273,346

(22) Filed: Nov. 18, 2008

(65) Prior Publication Data

US 2010/0125433 A1 May 20, 2010

(51) Int. Cl.
| H04M 3/00 | (2006.01) |
| G06Q 50/28 | (2012.01) |
| G06F 17/30 | (2006.01) |
| H04M 3/523 | (2006.01) |
| G06Q 10/04 | (2012.01) |

(52) U.S. Cl.
CPC .......... *G06Q 50/28* (2013.01); *G06F 17/30327* (2013.01); *G06Q 10/047* (2013.01); *H04M 3/5233* (2013.01)

(58) Field of Classification Search
CPC .............. H04M 3/523; H04M 3/5237; H04M 2203/402; G06F 17/30961; G06F 17/30327; G06F 17/30625

USPC .............. 379/265.21, 265.01–265.13
See application file for complete search history.

(56) References Cited

U.S. PATENT DOCUMENTS

| 5,754,639 | A | * | 5/1998 | Flockhart et al. | ........ 379/266.05 |
| 6,574,633 | B1 | * | 6/2003 | Jamalabad et al. | .................. 1/1 |
| 6,611,590 | B1 | | 8/2003 | Lu et al. | |
| 6,832,203 | B1 | | 12/2004 | Villena et al. | |
| 6,934,381 | B1 | | 8/2005 | Klein et al. | |
| 6,978,006 | B1 | * | 12/2005 | Polcyn | ..................... 379/265.12 |
| 6,985,576 | B1 | * | 1/2006 | Huck | ....................... 379/265.09 |
| 7,212,624 | B2 | | 5/2007 | O'Connor et al. | |
| 8,009,822 | B1 | * | 8/2011 | Boutcher et al. | ......... 379/265.11 |
| 2002/0095422 | A1 | * | 7/2002 | Burrows et al. | ............... 707/100 |

OTHER PUBLICATIONS

Kumar, A., G-Tree: A new data structure for orgainizing multidimensional data, Apr. 1994, IEEE Transactions on Knowledge and Data Engineering, vol. 6, No. 2, pp. 341-347.*

* cited by examiner

*Primary Examiner* — Rasha Al Aubaidi
*Assistant Examiner* — Jirapon Intavong

(57) ABSTRACT

An apparatus for selecting contact center resources is provided. The apparatus includes a memory and a processor in communication with the memory. The memory includes computer code executable with the processor. The computer code is configured to obtain one or more user characteristics; map a user point on a spatial map that includes a first resource spatial point for a first contact center resource, the user point being located at a point that spatially defines the one or more user characteristics; and determine a first distance between the user point and the first resource spatial point.

16 Claims, 5 Drawing Sheets

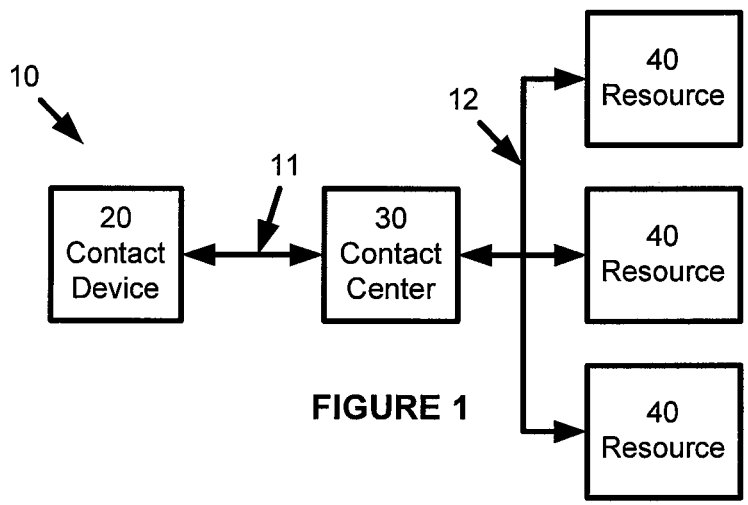
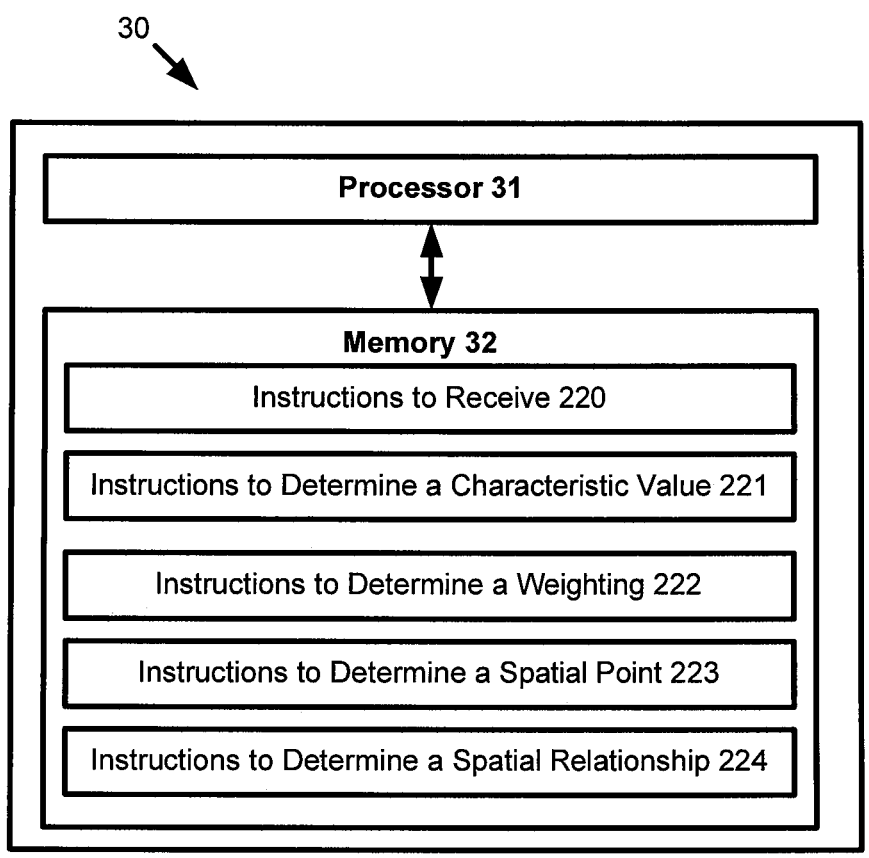
FIGURE 1
FIGURE 2

| Contact 1 | | |
|---|---|---|
| Characteristic 1 | Value 1 | Weighting 1 |
| Characteristic 2 | Value 2 | Weighting 2 |
| ⋮ | ⋮ | ⋮ |
| Characteristic n | Value n | Weighting n |

| Tom | | |
|---|---|---|
| User Characteristic | Value | Weighting |
| Characteristic 1: Financial Interpretation of the Stock's Purchase Price | 10 | 8 |
| Characteristic 2: Stock X | 10 | 2 |
| Characteristic 3: Customer Service | 10 | 6 |

FIGURE 5

| | Jack's Value | Jill's Value |
|---|---|---|
| Characteristic 1: Financial Interpretation of the Stock's Purchase Price | 10 | 5 |
| Characteristic 2: Stock X | 5 | 5 |
| Characteristic 3: Customer Service for Tom | 10 | 5 |

FIGURE 6

CONTACT CENTER ROUTING USING CHARACTERISTIC MAPPING

FIELD OF TECHNOLOGY

The presented embodiments relate to contact center routing using characteristic mapping.

BACKGROUND OF TECHNOLOGY

A contact center routes a contact to at least one queue. A queue has an absolutely ordered list of contact center resources. The ordering of the list of resources is based on one or more resource characteristic, such as skill of the resources, size of the resources, or availability of the resources. As the contacts are received into the queue, the contact center routes the contact based on the ordering of the list of resources. For example, a contact that is placed into a skill queue may be routed to the most skilled resource. Selection is based on one or more resource characteristic.

BRIEF DESCRIPTION OF THE DRAWINGS

FIG. 1 illustrates one embodiment of an enterprise system.
FIG. 2 illustrates one embodiment of a contact center.
FIG. 5 illustrates one example of three-dimensional (3D) contact spatial values and characteristic weightings.
FIG. 6 illustrates one example of 3D resource spatial values.

DETAILED DESCRIPTION

Figures 3, 4:
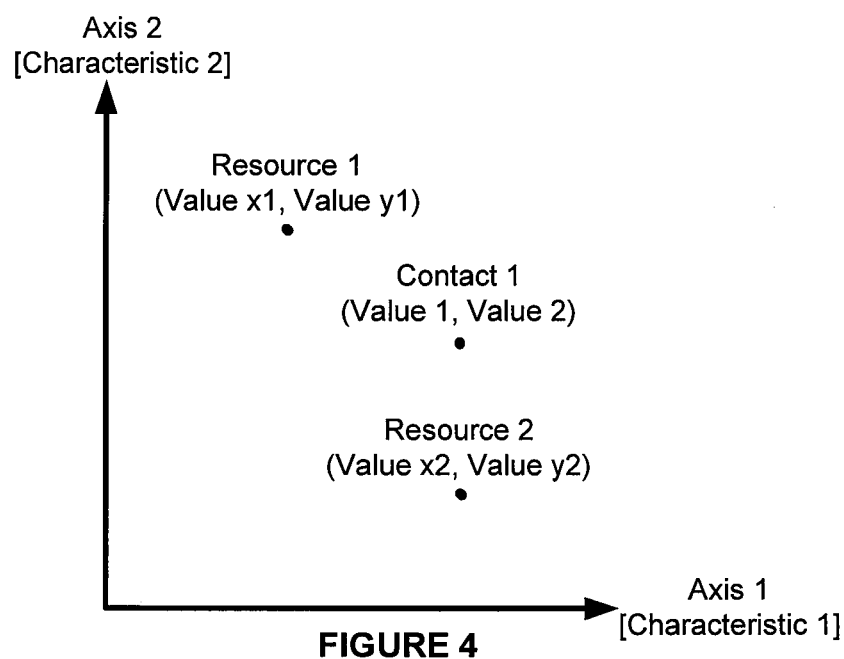
FIG. 3 illustrates one embodiment of n-dimensional spatial values and characteristic weightings.
FIG. 4 illustrates one embodiment of two-dimensional spatial mapping.

The present embodiments relate to contact center routing using characteristic mapping. "Contact" is used herein since the communications may be through a call (e.g., call center) or other media (e.g., e-mail or Internet). Routing involves dynamically selecting or matching one or more contact center resources. Mapping involves mapping characteristic points and determining spatial relationships between the characteristic points. The spatial relationships may be used to match one or more resource with a contact. Matching includes exact matching, relative matching, approximate matching, or other matches that are the same, almost the same, or different. As used herein, a "map" may be a multi-dimensional graph where contact center entities can be represented in different dimensions.

By way of introduction, the embodiments described below relate to systems, devices, apparatuses, methods, and processes for contact center routing using spatial mapping. In one method, a contact spatial point is determined. The contact spatial point is located on a contact center map. A first resource spatial point for a first contact center resource is determined and a second resource spatial point for a second contact center resource is determined. The first resource or the second resource is selected. Selection is based on a first distance between the first resource spatial point and the contact spatial point and a second distance between the second resource spatial point and the contact spatial point.

In one apparatus, a memory and a processor in communication with the memory are provided. The memory includes computer code executable with the processor. The computer code is configured to obtain one or more user characteristics; map a user point on a spatial map that includes a first resource spatial point for a first contact center resource, the user point being located at a point that spatially defines the one or more user characteristics; and determine a first distance between the user point and the first resource spatial point.

In another system, logic is encoded in one or more tangible media for execution. As used herein, logic encoded in one or more tangible media is defined as instructions that are executable by a programmed processor and that are provided on computer-readable storage media, memories, or a combination thereof. When executed, the logic is operable to determine a user spatial point based on one or more user characteristics; determine a first resource spatial point that is associated with a first resource supporting the contact center; determine a second resource spatial point that is associated with a second resource supporting the contact center; compare a first distance that is between the first resource spatial point and the user spatial point and a second distance that is between the second resource spatial point and the user spatial point; and select the first resource or the second resource as a function of the comparison.

In one illustration, which is referred to herein as "the above illustration," Tom is a preferred customer of a financial expert company (FEC), which employs Jack and Jill. In the past, Tom asked tax-related questions. Since Tom is a preferred customer, the FEC records and stores the satisfaction information. Tom uses a cellular telephone to call the FEC with a question regarding Stock X, which Tom would like to purchase. Tom's question relates to the financial interpretation of the stock's purchase price. Tom's phone call is answered by the FEC's call center. The call center uses an interactive voice response (IVR) system to obtain information relating to Tom, such as Tom's account number and questions. The obtained information is used to determine one or more characteristics relating to Tom. The contact center uses Tom's characteristics to determine Tom's spatial point on a spatial map. The contact center may also determine Jack's spatial point and Jill's spatial point on the spatial map relating to Tom's characteristics. Tom's spatial point may be mapped relative to Jack's spatial point and Jill's spatial point. The spatial mapping may be used to determine whether Jack's characteristics or Jill's characteristics most closely match the characteristics needed to satisfy Tom. For example, using the spatial mapping, the contact center may determine a first distance, which is the distance between Tom's spatial point and Jack's spatial point, and a second distance, which is the distance between Tom's spatial point and Jill's spatial point. The first and second distances may be weighted based on preference. Depending on which distance is shortest, Tom's phone call or a task offer for Tom's questions may be routed to Jack or Jill. Alternatively, a routing queue may be arranged as a function of the first and second distances.

FIG. 1 shows one embodiment of an enterprise system 10. The system 10 may include a contact device 20, a contact center 30, and one or more resources 40. The contact device 20 is continuously or periodically coupled with the contact center 30 through network 11. The contact center 30 is continuously or periodically coupled with the one or more resource 40 through the network 12. Herein, the phrase "coupled with" is directly connected to or indirectly connected through one or more intermediate components. Such intermediate components may include both hardware and software based components. In alternative embodiments, additional, different, or fewer components may be provided. For example, a plurality of contact devices 20 may be provided.

The contact device 20 is a telephone, session initiation protocol (SIP) device, personal digital assistance device, endpoint device, cellular device, wireless device, remote terminal device, personal computer, remote terminal device, local area network device, a communication device, any device or any combination of devices that allows a user to connect to the network 11 and contact the contact center 30. In the illustration above, since Tom is using a telephone to contact the FEC's contact center, Tom is the user and the telephone is the contact device 20.

The contact device 20 may be configured to allow a user to interact with the contact center 30, the one or more resources 40, other components of the system 10, or any combination thereof. The contact device 20 may include a speaker, a microphone, keyboard, keypad or a cursor control device (e.g., a mouse or a joystick), touch screen display, remote control, any combination thereof, or any other device operative to allow a user to interact with contact center 30 or one or more resources 40. For example, the contact device 20 may include a speaker that provides an interactive voice response (IVR) prompt, such as a voice command (e.g., "For assistance with Stock X, please press one"), to the user. In another example, the contact device 20 includes a keypad or microphone that allows the user to respond to an IVR prompt (e.g., the user may press "one" on the keypad).

The contact device 20 may communicate user information to the contact center 30. User information is information relating to the user of the contact device 20. User information may include user identification information, user characteristic information, user preference information, importance information, inquiry information, account information, related note information, device information, or any combination thereof. In the illustration above, Tom's account number (e.g., "Tom123"), question (e.g., "How to interpret a purchase price graph?"), and related note information (e.g., Stock X) are examples of user information. Alternatively, or in addition to, the contact center 20 may perform database lookups to derive user information. For example, the combination of the contacts incoming information and the derived information may be used.

FIG. 2 shows one embodiment of a contact center 30. The contact center 30 may include a processor 31 coupled with a memory 32. In alternative embodiments, additional, different, or fewer components may be provided. For example, the contact center 30 may include a display device, input device, or a port for communicating with other devices.

The contact center 30 is an enterprise communications system, call center, call router, enterprise router, personal computer, central server, call center server, broadcast system, central processing unit, or other device for contact center routing. The contact center 30 may provide automated assistance for connecting a contact device 20 with one or more resources 40 and/or selecting one or more resources 40. The contact center 30 may automatically select a resource 40 using spatial mapping. Selection may include selecting a resource 40 with a resource characteristic point that has a defined spatial relationship, such as the shortest distance to a contact characteristic point. The spatial relationship may be weighted to reflect preference. The contact center 30 may route the contact or provide a task offer to one or more resources 40 with the defined spatial relationship.

The processor 31 is a general processor, digital signal processor, application specific integrated circuit, field programmable gate array, analog circuit, digital circuit, combinations thereof, or other now known or later developed processor. The processor 31 may be a single device or a combination of devices, such as associated with a network or distributed processing. Any of various processing strategies may be used, such as multi-processing, multi-tasking, parallel processing, remote processing, centralized processing or the like. The processor 31 is responsive to instructions stored as part of software, hardware, integrated circuits, firmware, micro-code or the like. For example, the processor 31 may execute logic encoded in one or more tangible media, such as memory 32. As used herein, "logic encoded in one or more tangible media" is defined as instructions that are executable by the processor 31 and that are provided on computer-readable storage media, memories, or a combination thereof.

The processor 31 may communicate with the contact device 20, the one or more resource 40, or other communication device in the system 10. Communication may include transmitting or receiving a work item, telephone call, session initiation protocol (SIP) call, electronic mail (email) message, instant message, facsimile message, or any other type of communication, synchronous or asynchronous. For example, the contact center 30 may receive a phone call from the contact device 20. In another example, the contact center 30 may transmit a task offer to one or more of the resources 40.

The processor 31 may use user information to determine one or more user characteristics. A user characteristic may include a user attribute, feature, mark, identifier, property, quality, or trait. The user information may be received from the contact device 20, stored in memory, or a combination thereof. For example, account information (e.g., a user identification) may be received from the contact device 20. The processor 31 may use the account information to look up user information stored in a database, such as a user preference or agent preference. Agent preference may relate to the whether the user prefers one agent over another agent.

A user characteristic may be directly or indirectly related to satisfying the user or completing a task. In the illustration above, Tom's question (e.g., "interpreting a purchase price graph") and related note information (e.g., Stock X) are user characteristics. Furthermore, Tom's likelihood to ask tax-related questions may be a user characteristic.

The processor 31 may determine a user characteristic value for one or more user characteristic. The user characteristic value is a numerical value that describes the user characteristic. The user characteristic value may be an absolute value or non-variable value. The processor 31 may assign user characteristic values based on non-variable features of the user characteristics. For example, in the illustration above and as shown in Table 1, since Tom has a question relating to "interpreting a purchase price graph," the non-variable characteristic value for Characteristic 1 is 10 (e.g., for "yes"). Since Tom has a question relating to "Stock X," the non-variable value for Characteristic 2 is 10 (e.g., for "yes"). Since Tom has a history of asking tax-related questions, the non-variable characteristic value for Characteristic 3 is 10 (e.g., for "yes").

TABLE 1

Example User Characteristic Values

| Tom's Characteristics | Yes | No |
| --- | --- | --- |
| Characteristic 1: Interpreting a purchase price graph | 10 | 5 |
| Characteristic 2: Stock X | 10 | 5 |
| Characteristic 3: Tax-related Question | 10 | 5 |

Although Table 1 shows only user characteristic values for "yes" and "no" features, any number of characteristic features and/or sets of characteristic features may be used. For example, one set of characteristic features may include "very strong," "strong," "average," "weak," and "very weak." Another set of characteristic features may include "highly skilled," "average," and "novice."

The processor 31 may determine one or more resource characteristics for one or more resources 40. Determining one or more resource characteristics may include reading from memory, requesting from the resources 40, or retrieving from another component. The resource characteristics may be stored in memory and may change over time. For example, as user feedback is provided, the resources approval rating may change. In another example, the resources 40 provide information, which may be used to determine one or more resource characteristics.

The processor 31 may determine a resource characteristic value for one or more resource 40. A resource characteristic value may relate and/or associate a resource 40 to a user characteristic. For example, the resource characteristic value may define a resource's experience with the user characteristic (e.g., an agent's experience answering the user's question), may define whether the resource has certain capabilities or features provided in the characteristic (e.g., a trucks ability to carry livestock), may define the user's history of asking a question (e.g., a user's historical trend), the resources ability to answer a particular type of question, or other feature relating and/or associating the user characteristic with the resource 40.

The resource characteristic value is a numerical value that describes a resource's relationship to a user characteristic. The resource characteristic value may be an absolute value or non-variable value.

In the illustration above and as shown in Table 2, since Jack does not have experience with Characteristic 1 (e.g., Interpreting a purchase price graph), the resource characteristic value for Characteristic 1 is 5 (e.g., for "no"). Since Jack has experience with Characteristic 2 (e.g., Stock X), the resource characteristic value for Characteristic 2 is 10 (e.g., for "yes"). Since Tom is satisfied with Jack's financial service, the resource characteristic value for Characteristic 3 (e.g., Agent Preference) is 10 (e.g., for "yes").

TABLE 2

Example Resource Characteristic Values

| Jack | Yes | No |
|---|---|---|
| Characteristic 1: Has experience with interpreting a purchase price graph? | 10 | 5 |
| Characteristic 2: Has experience with Stock X? | 10 | 5 |
| Characteristic 3: Does Tom have a history of asking Tax-related questions? | 10 | 5 |

The characteristic values (e.g., user characteristic values and/or resource characteristic values) relate to a spatial map, the space being a characteristic space. The characteristic values are used to show spatial relationships between the contact's characteristics and the resource's characteristics. Accordingly, characteristic values for a particular characteristic, such as Characteristic 1, may have spatial relationships, such as a distance relationship.

The processor 31 may normalize the characteristic values (e.g., user characteristic values and/or resource characteristic values). Normalizing the characteristic values may include scaling the characteristic values, such that the characteristic values may be compared. For example, a characteristic value may be "0" or "1." The characteristic value may be normalized, such that the "0" corresponds to a "0" and the "1" corresponds to a "10." Any normalization procedure may be used to normalize the characteristic values.

The processor 31 may determine a contact characteristic point using one or more user characteristic values. The contact characteristic point may be defined by a combination of the user characteristic values. In the illustration above, as shown in FIG. 5, Tom's characteristic values are "10" for Characteristic 1, "10" for Characteristic 2, and "10" for Characteristic 3. Accordingly, Tom's spatial point is defined at [10, 10, 10] on a three-dimensional spatial map, such as the spatial map shown in FIG. 7.

The processor 31 may determine a resource characteristic point using one or more resource characteristic values. The resource characteristic point may be defined by a combination of the resource characteristic values. In the illustration above, as shown in FIG. 6, Jack's characteristic values are "5" for Characteristic 1, "10" for Characteristic 2, and "10" for Characteristic 3. Accordingly, Jack's spatial point is defined as [5, 10, 10] on a three-dimensional spatial map, such as the spatial map shown in FIG. 7.

The processor 31 may spatially map one or more spatial points (e.g., contact characteristic point and/or resource characteristic point) on a spatial map. A spatial map includes an n-dimensional coordinate system (where n is a natural or integer number, such as 0, 1, 2, 3, or more). The coordinates of the spatial map relate to the one or more contact characteristics to be mapped, such as the contact characteristics shown in FIG. 3. The characteristic values (e.g., contact characteristic values or resource characteristic values) are mapped on an axis, which relates to a dimension associated with the related characteristic. For example, as shown in FIG. 4, the spatial map is two-dimensional. Axis 1 is used to map values relating to Characteristic 1, and Axis 2 is used to map values relating to Characteristic 2. In another example, the spatial map is p-dimensional. The p-dimensions may relate to any number of different contact characteristics. The characteristic values, which relate to the contact characteristics associated with the defined dimension, are mapped in the defined dimension or on the axis designated for the defined dimension.

As shown in FIG. 4, the contact characteristic values for Contact 1 of FIG. 3 are mapped on the two-dimensional spatial map. Value 1 relating to Characteristic 1 is mapped along Axis 1. Value 2 relating to Characteristic 2 is mapped along Axis 2. The resource characteristic values for Resource 1 and Resource 2 may be mapped on the two-dimensional spatial map.

The resource characteristic points may be organized using a binary space partitioning, such as a k-dimensional tree (k-d tree). A k-d tree is a space-partitioning data structure for organizing points in a k-dimensional space. A k-d tree may be a data structure that is used several applications, such as searches involving a multidimensional search key (e.g. range searches and nearest neighbor searches). The binary space partitioning may be used to search for the resource point closest to the contact point. Any data structure may be used to search the resource points.

The processor 31 may determine a spatial relationship between the contact spatial point and one or more resource spatial points. Determining may include calculating, estimating, measuring, or predicting. A spatial relationship may include a spatial distance or area. The processor 31 may determine a distance from the user spatial point to one or more resource spatial point. For example, the processor 31 may calculate the distance $D_1$ from a user spatial point to a resource spatial point using Equation 1.

$$D_1 = \text{sqrt}[(\text{weight\_}C_1 * (\text{resource\_}A_1 - \text{contact\_}A_1))^2 + \ldots + (\text{weight\_}C_n * (\text{resource\_}A_n - \text{contact\_}A_n))^2] \quad \text{Equation 1}$$

In Equation 1, the distance $D\_A_1$ between the resource characteristic value on a first axis A1 (resource\_$A_1$) and the contact characteristic value on the first axis A1 (contact\_$A_1$) is determined (e.g., [resource\_$A_1$–contact\_$A_1$] in Equation 1). The distance $D\_A_1$ may be adjusted to reflect the importance of the contact characteristic being mapped on axis A1. For example, in Equation 1, the distance $D\_A_1$ is multiplied by the contact characteristic weighting (weight\_$C_1$) for the contact characteristic being mapped on axis A1. The weighted distance is squared and summed together with one or more other weighted distances (e.g., from other axis'). The square root of the summed weighted distances provides the distance from the contact point to a resource point.

Figure 7:
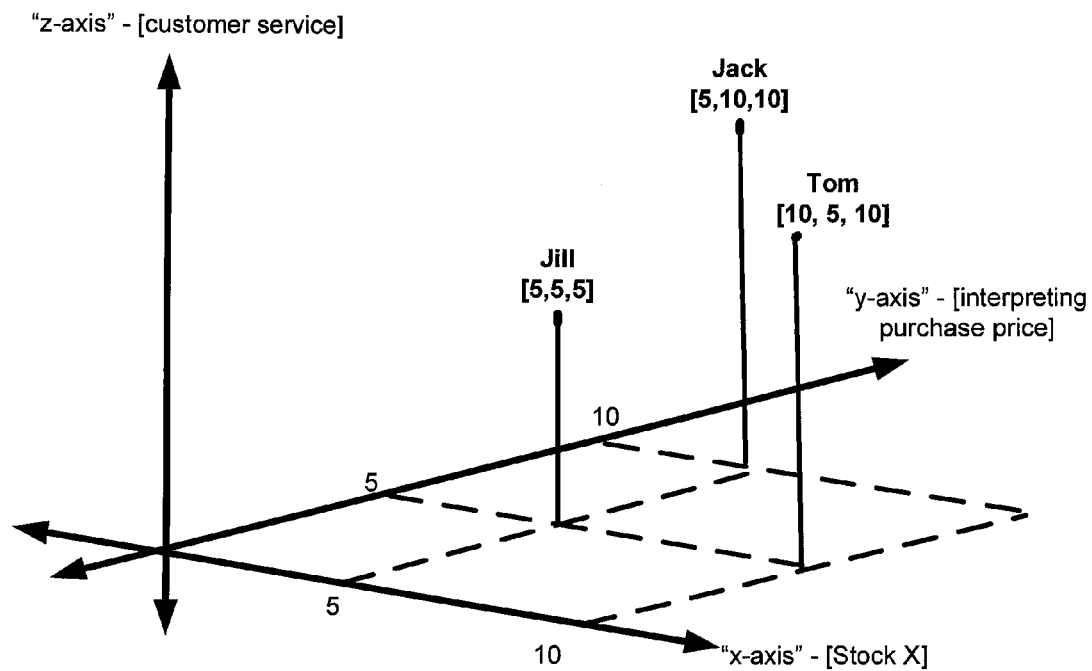
FIG. 7 illustrates one example of 3D spatial mapping for contact center routing.

As one example of Equation 1, in the illustration above, the processor 31 may use Equation 1 to determine the distance $D_{1\_jack}$ from Tom's spatial point to Jack's spatial point in the three-dimensional map shown in FIG. 7. Tom's characteristic value for Stock X (contact\_$A_1$), which is mapped on the x-axis, is 10; Jack's characteristic value for Stock X (resource\_$A_1$) is 5; and the weighting for Stock X (weight\_$C_1$) is 2. Tom's characteristic value for interpreting purchase price (contact\_$A_2$), which is mapped on the y-axis, is 5; Jack's characteristic value for interpreting purchase price (resource\_$A_2$) is 10; and the weighting for interpreting purchase price (weight\_$C_2$) is 8. Tom's characteristic value for customer service (contact\_$A_3$), which is mapped on the z-axis, is 10; Jack's characteristic value for customer service (resource\_$A_3$) is 5; and the weighting for customer service (weight\_$C_3$) is 6. Accordingly, the distance $D_{1\_jack}$ from Tom's spatial point [10, 5, 10] to Jack's spatial point [5, 10, 10] may be determined using Equation 1. The distance $D_{1\_jill}$ from Tom's spatial point [10, 5, 10] to Jill's spatial point [5, 5, 5] may be determined using Equation 1.

The processor 31 may compare spatial relationships. For example, the processor 31 may compare a first distance to a second distance. The first distance may be a distance from the contact spatial point to a first resource spatial point, and the second distance may be a distance from the contact spatial point to a second resource spatial point. In the illustration above, the processor 31 may compare distance $D_{1\_jack}$ and distance $D_{1\_jill}$.

The processor 31 may use one or more spatial relationships to perform various acts, such as selecting, assigning, routing, broadcasting, arranging, or any combination thereof.

The processor 31 may select one or more resources based on the comparison of the spatial relationships. Selecting may include choosing, removing, or eliminating. For example, the processor 31 may select the resource with the resource spatial point closest to the contact resource point. In another example, the processor 31 may remove the two resources with resource spatial points that are furthest from the contact spatial point. The two resources may be removed from an assignment queue used when communication is received from a user. In another example, the processor 31 may choose the five (5) resources with the closest resource spatial points to be placed in a broadcast group.

The processor 31 may select one or more contacts based on the comparison of the spatial relationships. The spatial map may be used for bi-directional searching. For example, an agent may use the spatial map to search for a contact with the closest match. Alternatively, or in addition to, the contact center may map the contact with a closest match resource.

One or more of the selected resources 40 may be assigned to the user based on one or more spatial relationships. Assignment may include allocation, setting aside, setting apart, or designation. For example, the contact center 30 may be a trucking contact center. Fred calls the trucking contact center to request a livestock truck that carries 10 cows. The trucking contact center selects livestock truck #3, which carries 10 cows, using spatial mapping to match Fred's requested characteristics with livestock truck #3. The livestock truck #3 may be assigned to Fred. Accordingly, the livestock truck #3 may not be assigned to another person.

The processor 31 may route the communication to one or more of the selected and/or non-selected resources 40 based on one or more spatial relationship. For example, a phone call may be routed to the resource 40 with a resource spatial point that is nearest to the contact spatial point. One benefit of routing the call to the resource 40 with the nearest spatial point is that the resource 40 will be more likely, relative to other resources 40, to satisfy the user since the resource 40 with the nearest spatial point has characteristics that match (on average) the contact characteristics more than the other resources 40.

The processor 31 may broadcast or transmit a task offer to one or more of the selected and/or non-selected resources 40 based on one or more spatial relationship. The task offer may be transmitted to a single resource 40, or broadcast a plurality of resources 40 (e.g., synchronously or asynchronously) or a broadcast group. The task offer may be accepted, rejected, or ignored by the one or more resources 40 receiving the task offer. For example, an assignment queue may include a first resource, a second resource, and a third resource. The three resources 40 may be the resources with the nearest resource spatial points. The contact center may transmit the task offer to a first resource in the assignment queue. If the task offer is rejected or ignored by the first resource 40, the contact center 30 may transmit the task offer to the second resource 40 in the assignment queue. If the task offer is rejected or ignored by the second resource 40, the contact center 30 may then transmit the task offer to the third resource 40. In an alternative example, the contact center 30 may broadcast the task offer to all three resources 40 at the same time.

The processor 31 may arrange a queue based on the comparison of the spatial relationships. In one embodiment, the assignment queue may be arranged such that one or more resources 40 are arranged based on the comparison of distances to the contact spatial point. For example, the resource with the resource spatial point closest to the contact spatial point may be arranged at the top of the assignment queue.

The memory 32 is computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 32 may be a single device or a combination of devices. The memory 32 may be adjacent to, part of, networked with and/or remote from the processor 31. The memory 32 may include computer code executable with the processor 31. The computer code may be written in any computer language, such as C++, C#, Java, Pascal, Basic, Perl, HyperText Markup Language (HTML), assembly language, and or any combination thereof. The computer code may include logic encoded in one or more tangible media for execution by the processor 31. Herein, "logic encoded in one or more tangible media for execution" is the instructions that are executable by the processor 31 and that are provided on the computer-readable storage media, memories, or a combination thereof.

In one exemplary embodiment, as shown in FIG. 2, the memory 32 includes instructions that are executable by the processor 31. The memory 32 includes instructions to receive 220, instructions to determine a characteristic value 221, instructions for determining a characteristic weighting 222, instructions for mapping a contact characteristic point 223, and instructions for determining a relationship between the contact spatial point and one or more resource characteristic points 224. In alternative embodiments, additional, different, or fewer instructions are provided. For example, instructions for determining a broadcast group may be provided. In another example, instructions for broadcasting a task offer to one or more selected resource.

The instructions to receive 220 may be executed to receive one or more contact characteristics. The one or more contact characteristics may be received from the contact device 20, a database stored in memory 32, or other component of the system 10. The instructions to determine a characteristic value 221 may be executed to determine a characteristic value for the one or more contact characteristics. The instructions to determine a weighting 222 may be executed to determine a user weighting for each user characteristic.

The instructions to determine a spatial point 223 may be executed to determine one or more spatial points relating to a user and/or one or more resource 40. The instructions 223 may also be executed to map the one or more determined spatial points on an n-dimensional spatial map. The instructions for determining a spatial relationship 224 may be executed to determine the resource 40 that has characteristics that most closely match the contact characteristics for the contact. For example, the instructions 224 may be executed to calculate a first distance between the contact spatial point and a first resource 40, and a second distance between the contact spatial point and a second resource 40. The instructions 224 may be executed to compare the first calculated distance to the second calculated distance. The resource with the closest resource spatial point may be resource with the closest relationship.

The one or more resources 40 are devices that support the contact center 30. Examples of a resource 40 include, but are not limited to, an automated telephone service device (e.g., an IVR device), a telephone supported by an agent (e.g., a financial agent), a personal computer, a truck, personal digital assistant ("PDA"), cellular phone, or other device for serving a contact that contacts the contact center 30. For example, a resource 40 may be operated or supported by seated agents, informal (or remote) agents, knowledge workers, or supporting agents. In another example, the resources 40 or agents operating the resources 40 may handle work items and tasks such as support cases and documents.

In one embodiment, the resources 40 may accept or reject a task offer. A task offer is an offer to a resource 40 to accept an opportunity to serve the contact. For example, resources may reject a task offer that is associated with mutual funds because the financial advisor has little experience with mutual funds. In other embodiments, the resources 40 are automated without direct agent control.

Figure 8:
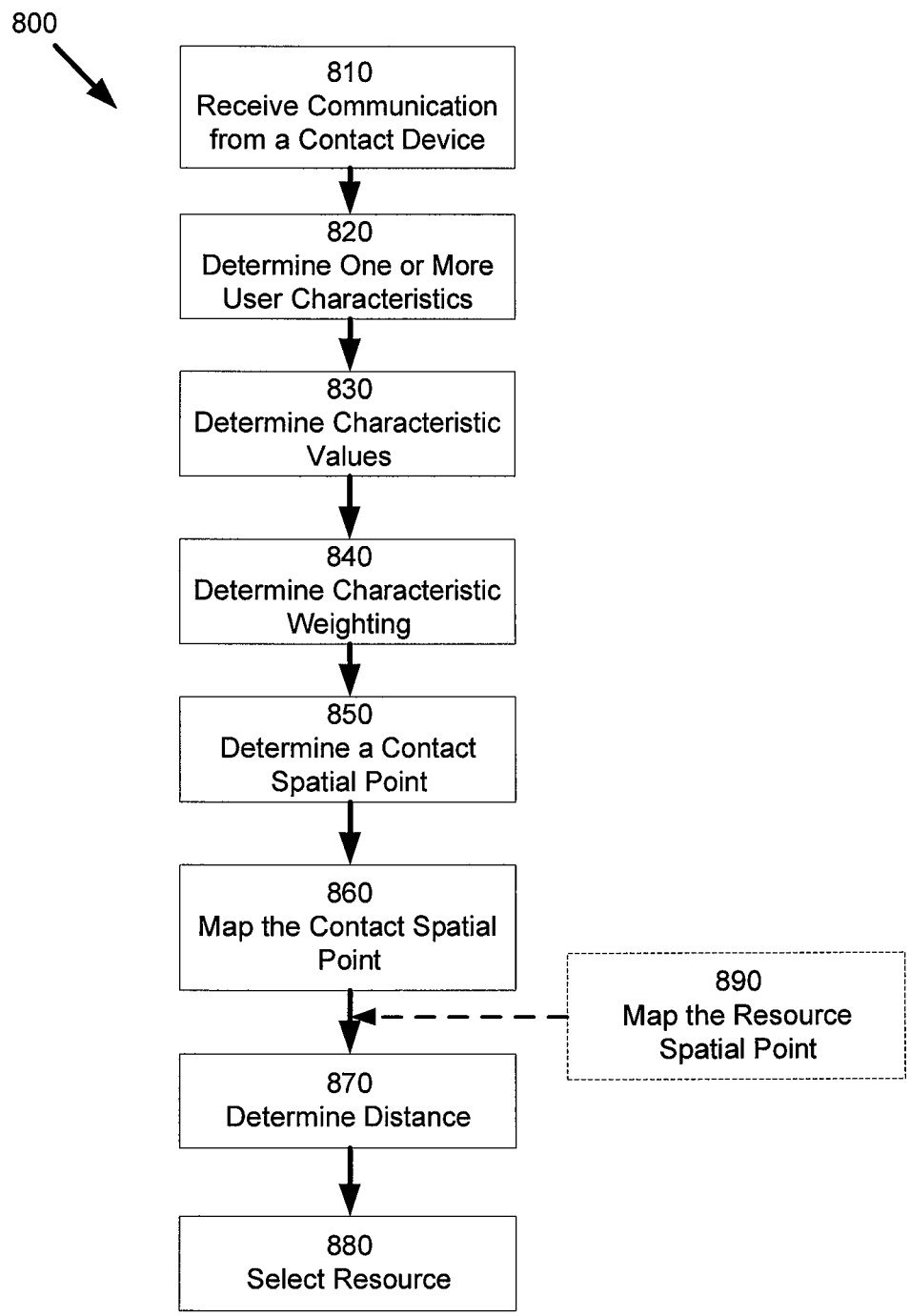
FIG. 8 illustrates one embodiment of a method for selecting resources using spatial mapping.

FIG. 8 shows one embodiment of a method 800 for routing a contact to a contact center resource. The method is implemented using the system 10 of FIG. 1 or a different system. The acts may be performed in the order shown or a different order. The acts may be performed automatically, manually, or the combination thereof.

As shown in the exemplary embodiment of FIG. 8, the method 800 may include receiving communication from a contact device 810, determining one or more contact characteristics 820, determining characteristic values 830, determining a characteristic weighting for the one or more contact characteristics 840, determining a contact spatial point 850, mapping the contact spatial point 860, determining the distance between the contact spatial point and one or more resource spatial point 870, and selecting the resource with the resource spatial point closest to the contact spatial point 880. In alternative embodiments, additional, different, or fewer acts may be provided. For example, as shown in FIG. 8, one or more resource spatial points may be mapped 890. Mapping the resource spatial points may take place before, during, or after any of the other acts. The resource spatial points may be mapped, for example, for individual contacts, for assignment queues, or for contact center systems. The resource spatial points may be mapped continuously, periodically (e.g., after a new contact is received, daily, or hourly), manually, or automatically. In another example, the method may include broadcasting a task offer to one or more chosen resources. In another example, the method may include determining a resource spatial point.

In block 810 of FIG. 8, a contact center receives communication from a contact device, which may be operated by a contact. In block 820, the contact center determines one or more contact characteristics, which may define the contact, the needs of the contact, or other characteristics related to the contact. The one or more contact characteristics may be determined by using the communication, reading from a memory, querying or a combination thereof. In block 830, the contact center or contact device determines a characteristic value for all, some, or none of the one or more user characteristics. Block 830 may include determining one or more resource characteristics and one or more resource characteristic values. A characteristic weighting is determined for all, some, or none of the one or more contact characteristics, in block 840. The weighting may be obtained from a configuration, user preference, a database lookup, data store, or other place that provides or stores weightings. The contact center or contact device determines a contact spatial point, in block 850. The contact spatial point is determined as a function of the one or more characteristic values. In one example, one or more resource spatial points may be determined.

The one or more resource spatial points may be mapped. In block 860, the contact spatial point is mapped relative to resource spatial points. The distance between the contact spatial point and one or more resource spatial point is determined in block 870. The distance may be calculated as a function of one or more characteristics values, one or more resource values, one or more characteristic weightings, or any combination thereof. In block 880, the resource with the resource spatial point closest to the contact spatial point is selected. Block 880 may include comparing the distance between the contact spatial point and one or more resource spatial point. The resource associated with the resource spatial point nearest the contact spatial point may be selected. Alternatively, two or more resources associated with resource spatial points that are close to or near the contact spatial point may be selected to define a broadcast group.

One benefit of mapping contact spatial points relative to resource spatial points is that any number of characteristics may be matched to the characteristics of the resource. In addition, the relationship between the contact characteristics and resource characteristics may be weighted to reflect the importance of one or more need of the contact. Using the spatial mapping technique, the contact center may dynamically determine the resource that is best suited to assist or serve the contact. Accordingly, the contact (or customer) is satisfied.

Various embodiments described herein can be used alone or in combination with one another. The foregoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method comprising:
   determining, by a processor, a user point on a contact center characteristic map that includes n-dimensions;
   determining, by the processor, a first resource point on the contact center characteristic map for a first contact center resource and a second resource point on the contact center characteristic map for a second contact center resource;
   mapping the user point, the first resource point, and the second resource point on the contact center characteristic map, wherein a first user characteristic is associated with a first dimension of the n-dimensions and a second user characteristic is associated with a second dimension of the n-dimensions;
   organizing, by the processor, the first resource point and the second resource point using a binary space partitioning tree including a k-d tree;
   arranging, by the processor, the first contact center resource and the second contact resource in a routing queue based on the organization of the first and second resource points, which includes a first distance on the contact center characteristic map between the first resource point and the user point and a second distance on the contact center characteristic map between the second resource point and the user point; and
   selecting, by the processor, the first resource or the second resource based on the routing queue.

2. The method of claim 1, wherein determining the user point comprises:
   determining a first user characteristic value that defines the first user characteristic; and
   determining a second user characteristic value that defines the second user characteristic, wherein the user point is located on the contact center characteristic map at an intersection of the first user characteristic value and the second user characteristic value.

3. The method of claim 1, wherein the selection includes comparing the first distance to the second distance and determining whether the first distance is shorter than the second distance.

4. The method of claim 1, comprising routing communication to the first resource, when the first distance is shorter than the second distance.

5. The method of claim 2, comprising:
   determining a first weighting that defines an importance of the first user characteristic relative to the second user characteristic; and
   determining a second weighting that defines an importance of the second user characteristic relative to the first user characteristic.

6. The method of claim 5, comprising:
   determining the first distance between the first resource point and the user point based on the first weighting and the second weighting; and
   determining the second distance between the second resource point and the user point based on the first weighting and the second weighting.

7. An apparatus comprising: a memory device; and a processor in communication with the memory device, the memory device including computer code executable by the processor to:
   receive a plurality of user characteristics;
   map a first resource point on a characteristic map that includes n-dimensions, the first resource point being for a first contact center resource;
   map a second resource point on the characteristic map, the second resource point being for a second contact center resource;
   map a user point on the characteristic map, the user point being located at a point that defines the plurality of user characteristics;
   map the user point, the first resource point, and the second resource point on the characteristic map, wherein a first user characteristic of the plurality of user characteristics is associated with a first dimension of the n-dimensions and a second user characteristic of the plurality of user characteristics is associated with a second dimension of the n-dimensions;
   organize, in a k-dimensional space, the first resource point and the second resource point using a k-d tree, the k-d tree derived from binary space partitioning that includes recursively dividing a node into two nodes until the partitioning of nodes satisfies a criteria;
   determine a first distance between the user point and the first resource point on the characteristic map, based on the organization of the first and second resource points;
   determine a second distance between the user point and the second resource point on the characteristic map, based on the organization of the first and second resource points;
   arrange the first contact center resource and the second contact resource in a routing queue based on the first distance and the second distance; and
   select the first contact center resource or the second contact center resource based on the queue.

8. The apparatus of claim 7, wherein the computer code is executable by the processor to:
   compare the first distance and the second distance;
   select the first contact center resource, when the first distance is smaller than the second distance; and
   select the second contact center resource, when the second distance is smaller than the first distance.

9. The apparatus of claim 8, wherein the computer code is executable by the processor to route a received communication to the selected first contact center resource or the second contact center resource.

10. The apparatus of claim 7, wherein the first resource point defines one or more resource characteristics for the first contact center resource and the second resource point defines one or more resource characteristics for the second contact center resource.

11. The apparatus of claim 7, wherein the computer code is configured to broadcast a task offer to a broadcast group.

12. A storage device with instructions for execution by a processor, the storage device comprising:
   instructions executable by the processor to determine a user point based on a plurality of user characteristics;
   instructions executable by the processor to determine a first resource point that is associated with a first resource supporting a contact center;

instructions executable by the processor to determine a second resource point that is associated with a second resource supporting the contact center;

instructions executable by the processor to map the user point, the first resource point, and the second resource point on a map that includes n-dimensions, wherein a first user characteristic of the plurality of user characteristics is associated with a first dimension of the n-dimensions and a second user characteristic of the plurality of user characteristics is associated with a second dimension of the n-dimensions;

instructions executable by the processor to use a k-d tree to organize the first resource point and the second resource point in a k-dimensional space, k-d tree being derived from binary space partitioning that includes recursively dividing a node into two nodes until the partitioning of nodes satisfies a criteria;

instructions executable by the processor to determine a first distance that is between the first resource point and the user point with respect to the k-d tree and a second distance that is between the second resource point and the user point with respect to the k-d tree, use the k-d tree;

instructions executable by the processor to arrange the first resource and the second resource in a routing queue based on the first distance and the second distance; and instructions executable by the processor to select the first resource or the second resource based on the queue.

13. The storage device of claim 12, further comprising:

instructions executable by the processor to select the first resource, when the first distance is smaller than the second distance; and instructions executable by the processor to select the second resource, when the second distance is smaller than the first distance.

14. The storage device of claim 13, further comprising instructions executable by the processor to route communication to the selected first resource or the selected second resource.

15. The storage device of claim 12, further comprising instructions executable by the processor to determine a broadcast group from a plurality of resources that includes the first resource and the second resource.

16. The storage device of claim 14, further comprising instructions executable by the processor to broadcast a task offer to the broadcast group, the task offer being an offer to perform a contact center service for a corresponding user.

* * * * *